(12) United States Patent
Chen

(10) Patent No.: US 7,422,277 B2
(45) Date of Patent: Sep. 9, 2008

(54) HEATING APPARATUS FOR SEAT CUSHION OF CAR

(76) Inventor: Chien-Chou Chen, 25, Lane 89, Yuguang Li, Anping District, Tainan (TW)

( * ) Notice: Subject to any disclaimer, the term of this patent is extended or adjusted under 35 U.S.C. 154(b) by 0 days.

(21) Appl. No.: 11/545,852

(22) Filed: Oct. 10, 2006

(65) Prior Publication Data

US 2008/0084096 A1 Apr. 10, 2008

(51) Int. Cl.
*A47C 7/74* (2006.01)
(52) U.S. Cl. .................................. 297/180.12
(58) Field of Classification Search ............ 297/180.12, 297/180.1; 219/529
See application file for complete search history.

(56) References Cited

U.S. PATENT DOCUMENTS

| | | | | | |
|---|---|---|---|---|---|
| 2,340,097 | A | * | 1/1944 | Woodman | 219/529 |
| 4,590,359 | A | * | 5/1986 | Mobius | 219/217 |
| 4,628,188 | A | | 12/1986 | Andreasson | 219/528 |
| 5,002,335 | A | * | 3/1991 | Bengtsson | 297/180.12 |
| 5,986,243 | A | * | 11/1999 | Campf | 219/529 |
| 6,093,908 | A | | 7/2000 | Haag | 219/204 |
| 6,150,642 | A | * | 11/2000 | Weiss et al. | 219/528 |
| 6,452,138 | B1 | | 9/2002 | Kochman et al. | 219/549 |
| 6,897,417 | B1 | | 5/2005 | Usselman et al. | 219/528 |
| 6,988,770 | B2 | * | 1/2006 | Witchie | 297/180.14 |
| 7,178,866 | B1 | * | 2/2007 | Scott | 297/180.12 |
| 2007/0012675 | A1 | * | 1/2007 | Devroy | 219/212 |

* cited by examiner

Primary Examiner—Milton Nelson, Jr.
(74) Attorney, Agent, or Firm—Alan Kamrath; Kamrath & Associates PA

(57) ABSTRACT

A heating apparatus includes a carbon fiber heating layer placed in a positioning jacket which is mounted in a seat cushion, a conducting coupler electrically connected to the carbon fiber heating layer, and a control switch electrically connected to the conducting coupler. Thus, when the connector of the control switch is attached to the conducting coupler, and the plug of the control switch is inserted into the cigarette lighter of the car, the electric current from the car battery in turn flows through the control switch, the conducting coupler and the conducting cord into the carbon fiber bundles which produce an impedance to convert the electrical energy into a heat energy to heat the seat cushion to warm the user seated on the seat cushion, thereby providing a comfortable sensation to the user.

15 Claims, 6 Drawing Sheets

HEATING APPARATUS FOR SEAT CUSHION OF CAR

BACKGROUND OF THE INVENTION

1. Field of the Invention

The present invention relates to a heating apparatus and, more particularly, to a heating apparatus for a seat cushion of a car.

2. Description of the Related Art

A conventional seat of a car in accordance with the prior art shown in FIG. 6 comprises a seat portion 14, a backrest 16, and a seat cushion 10 enclosed around the seat portion 14 and the backrest 16. However, the car seat does not have a heating function to provide a warming effect to the user in the winter. Conventional heating devices are disclosed in the U.S. Pat. No. 6,452,138; 6,897,417; 4,628,188; and 6,093,908. However, such heating devices are not available for the seat cushion of a car and cannot be removed for washing.

BRIEF SUMMARY OF THE INVENTION

In accordance with the present invention, there is provided a heating apparatus, comprising a carbon fiber heating layer placed in a positioning jacket which is mounted in a seat cushion, a conducting coupler mounted on the seat cushion and electrically connected to the carbon fiber heating layer, and a control switch electrically connected to the conducting coupler to supply an electric power through the conducting coupler to the carbon fiber heating layer.

The primary objective of the present invention is to provide a heating apparatus that provides a heating effect to the seat cushion of a car.

Another objective of the present invention is to provide a heating apparatus, wherein when the connector of the control switch is attached to the conducting coupler, and the plug of the control switch is inserted into the cigarette lighter of the car, the electric current from the car battery in turn flows through the control switch, the conducting coupler and the conducting cord into the carbon fiber bundles which produce an impedance to convert the electrical energy into a heat energy to heat the seat cushion to warm the user seated on the seat cushion, thereby providing a comfortable sensation to the user.

A further objective of the present invention is to provide a heating apparatus, wherein the automatic timing device of the control switch is started, so that when the time for supplying the electric power reaches the preset value of the automatic timing device, the automatic timing device shuts the electric power of the control switch automatically to stop operation of the heating apparatus to prevent the electric power supplied by the car battery from being exhausted when the user forgets to turn off the power supply button of the control switch.

A further objective of the present invention is to provide a heating apparatus, wherein the power supply button of the control switch is pressed slightly to regulate the heating temperature of the seat cushion, thereby facilitating the user regulating the heating temperature of the seat cushion according to his requirement.

A further objective of the present invention is to provide a heating apparatus, wherein the seat cushion can be removed for washing.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
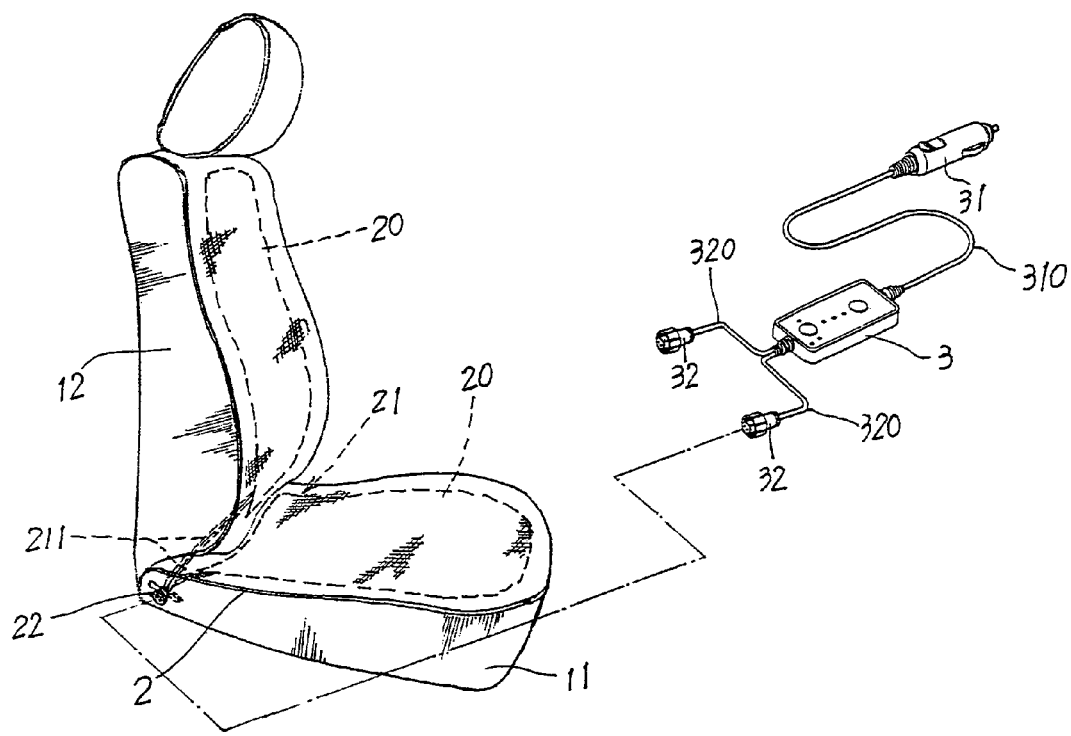
FIG. 1 is a partially exploded perspective view of a heating apparatus in accordance with the preferred embodiment of the present invention.

Referring to the drawings and initially to FIG. 1, a heating apparatus for in accordance with the preferred embodiment of the present invention comprises a carbon fiber heating layer 21 placed in a positioning jacket 20 which is mounted in a seat cushion 2 which is mounted on the seat 11 and the backrest 12 of a car, a conducting coupler 22 mounted on the seat cushion 2 and electrically connected to the carbon fiber heating layer 21, and a control switch 3 electrically connected between an electric power supply and the conducting coupler 22 to supply an electric power through the conducting coupler 22 to the carbon fiber heating layer 21.

Figure 2:
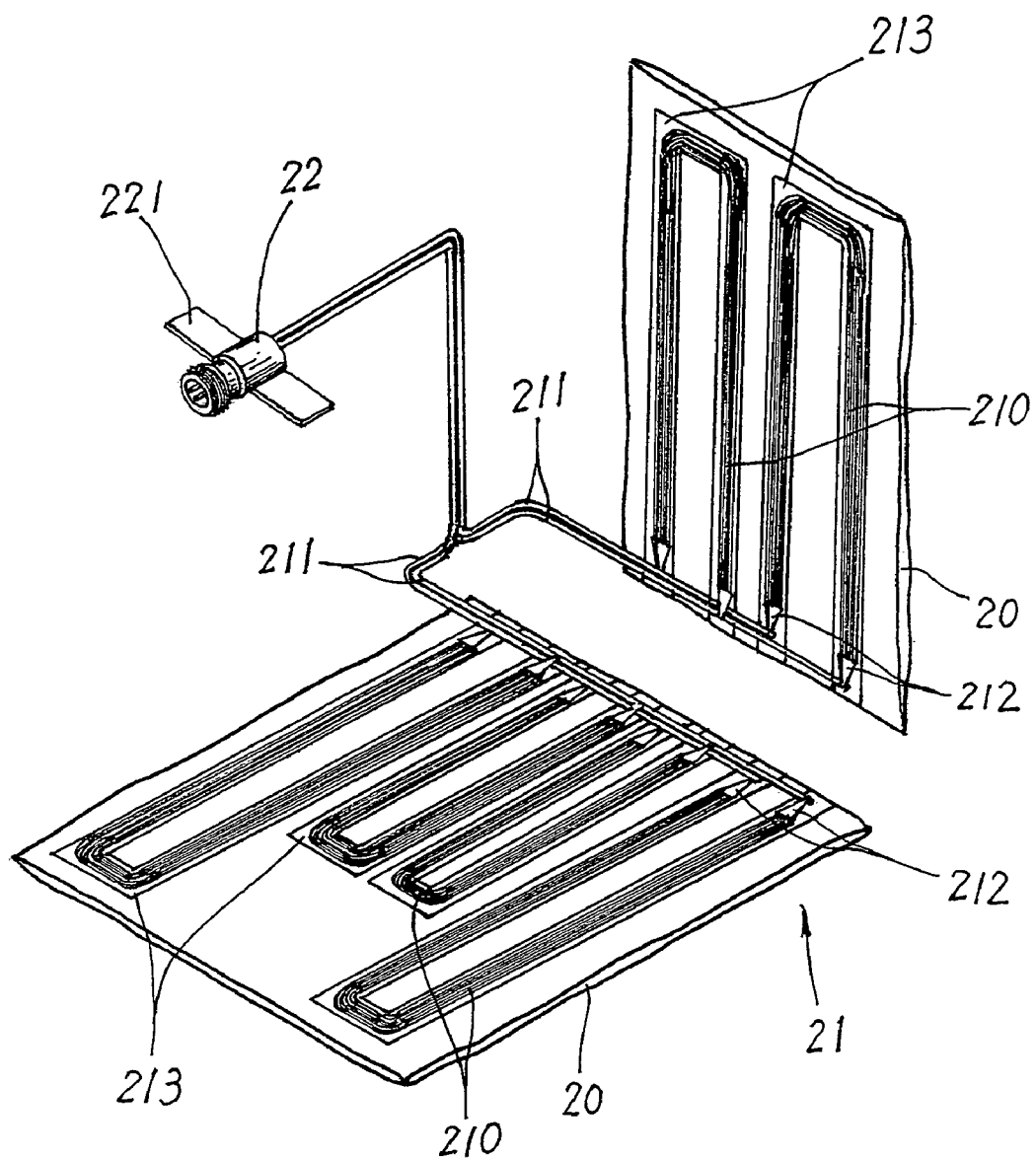
FIG. 2 is a perspective view of a carbon fiber heating layer of the heating apparatus as shown in FIG. 1.

Referring to FIGS. 1 and 2, the positioning jacket 20 is mounted in the seat cushion 2 by sewing. The carbon fiber heating layer 21 includes a conducting cord 211, a plurality of carbon fiber bundles 210 each having two ends connected to the conducting cord 211, and a plurality of plastic thin film layers 213 each enclosed around a surface of a respective carbon fiber bundle 210. Each of the carbon fiber bundles 210 has a flat shape to provide a soft sensation to the user without affecting the user's comfort. Each end of each of the carbon fiber bundles 210 is bonded to the conducting cord 211 by a hub 212. The carbon fiber bundles 210 are isolated from the positioning jacket 20 by the plastic thin film layers 213 which provide a waterproof effect to the carbon fiber bundles 210 to prevent the carbon fiber bundles 210 from being wet by water from the seat cushion 2.

Figure 3:
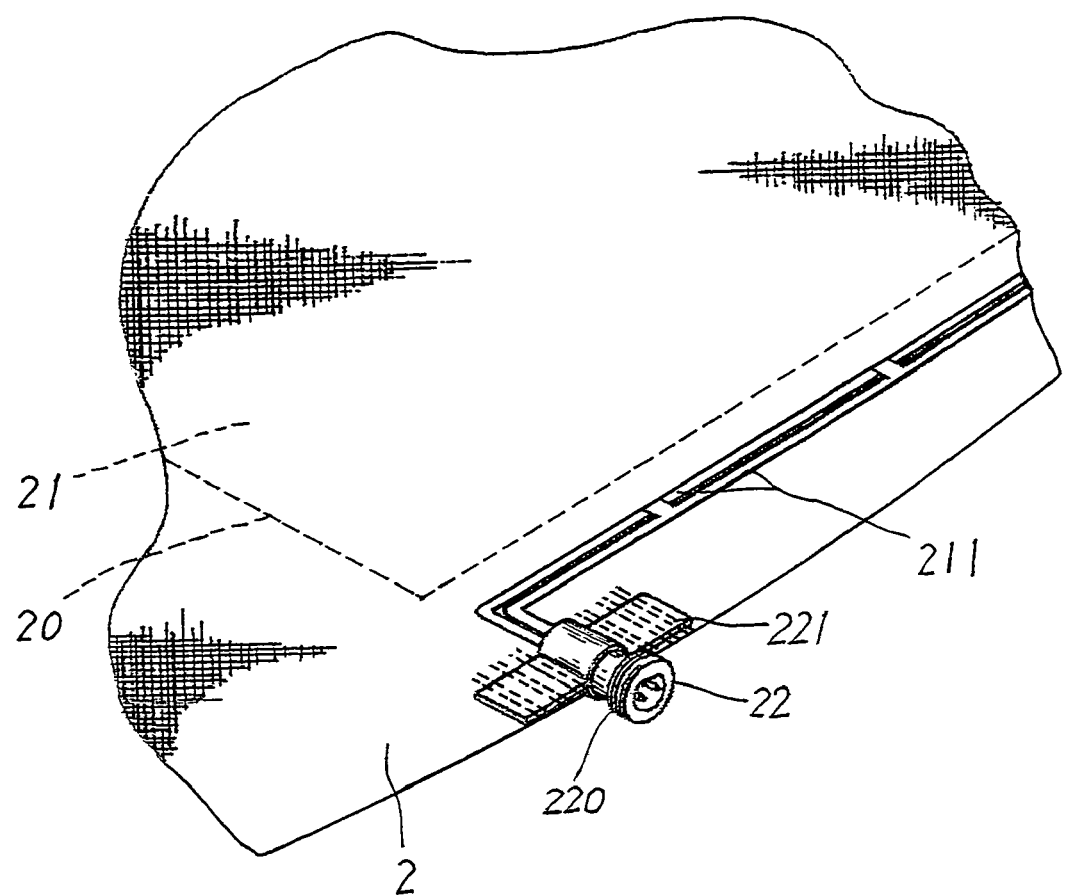
FIG. 3 is a perspective view of a conducting coupler of the heating apparatus as shown in FIG. 1.
Figure 4:
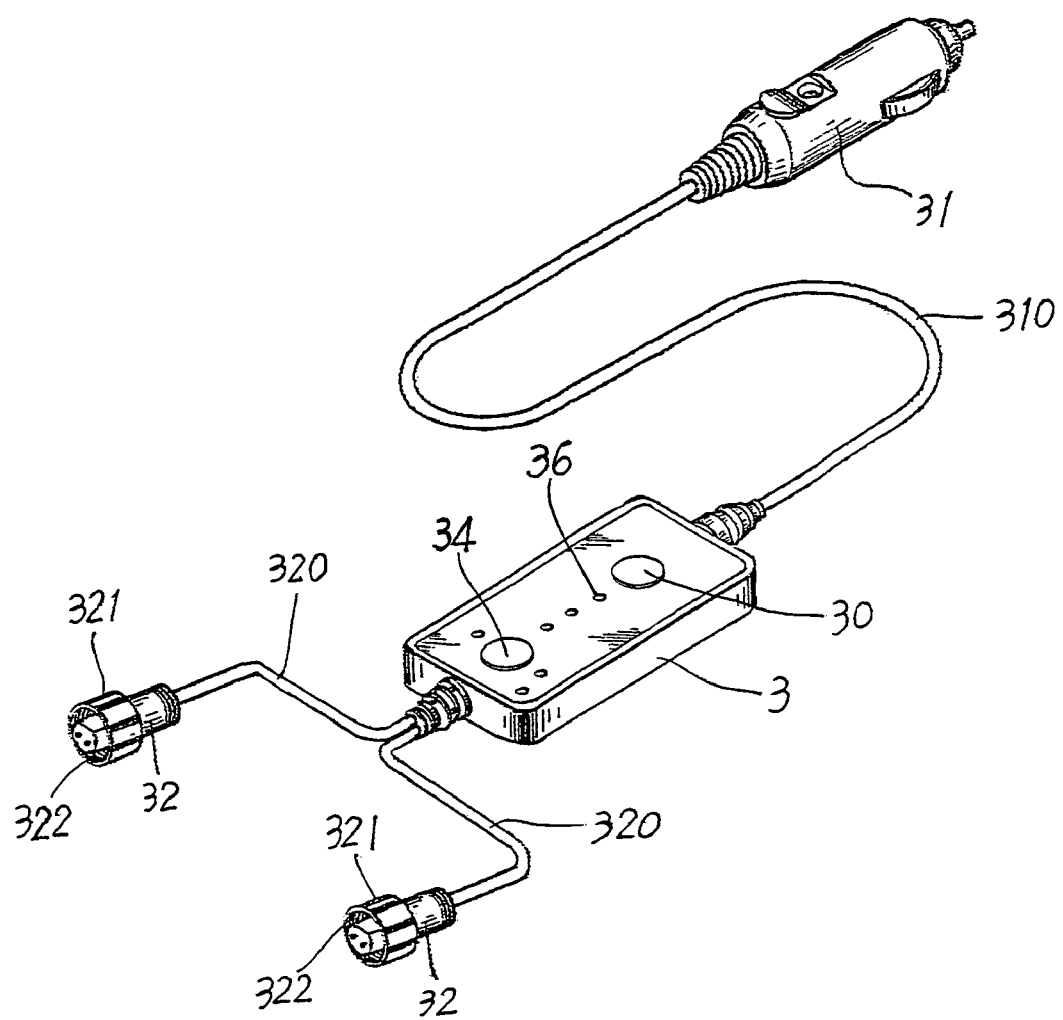
FIG. 4 is a perspective view of a control switch of the heating apparatus as shown in FIG. 1.
Figure 5:
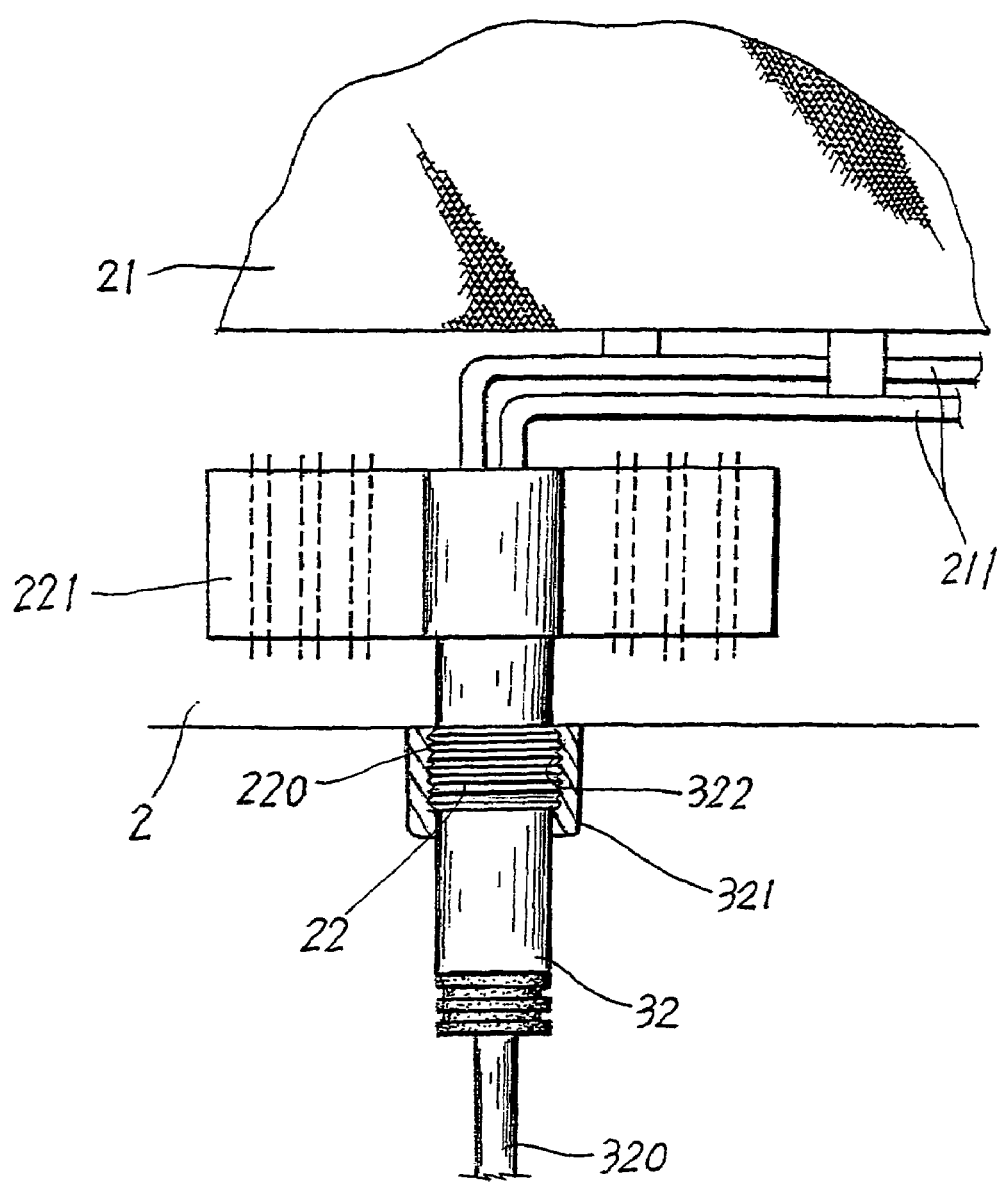
FIG. 5 is a top plan cross-sectional assembly view of the heating apparatus as shown in FIG. 1.
Figure 6:
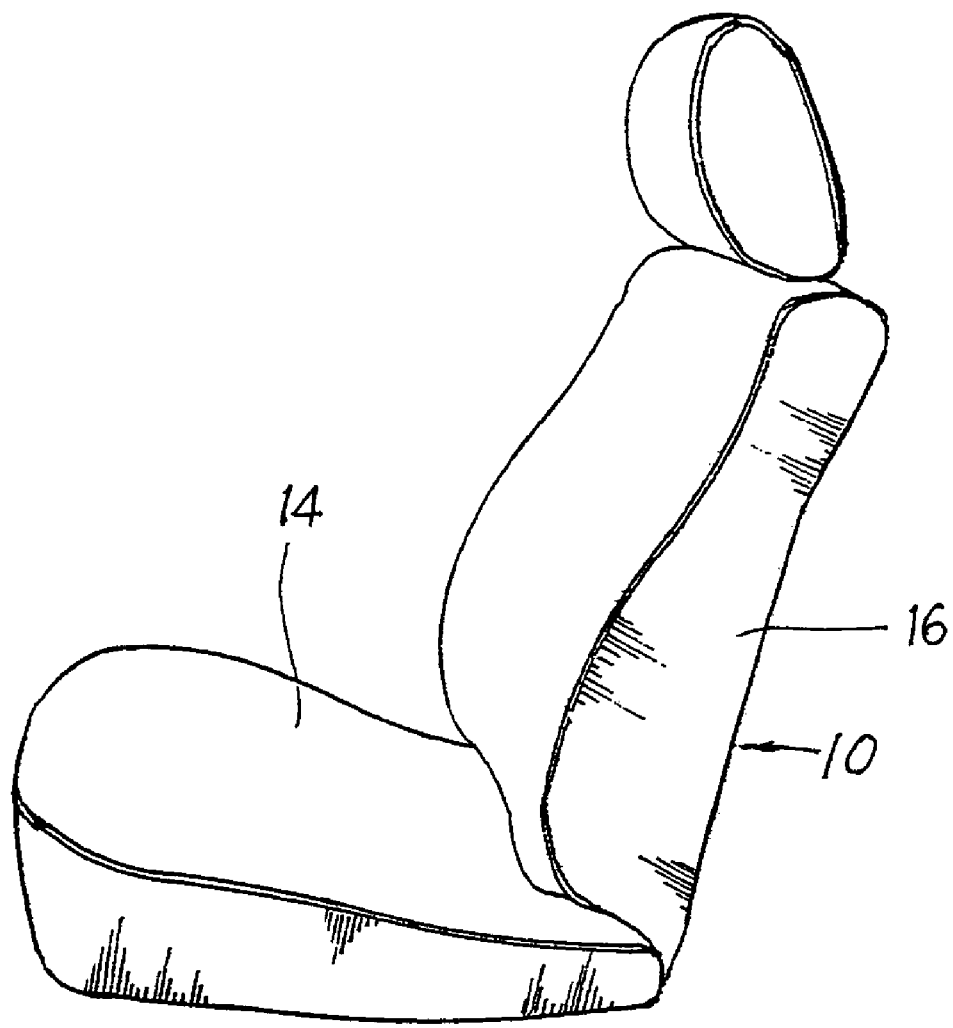
FIG. 6 is a perspective view of a conventional seat of a car in accordance with the prior art.

Referring to FIGS. 1-3, the conducting coupler 22 is electrically connected to the conducting cord 211 of the carbon fiber heating layer 21, so that when an electric current flows through the conducting coupler 22 and the conducting cord 211 into the carbon fiber bundles 210, the carbon fiber bundles 210 produce an impedance to convert the electrical energy into a heat energy to heat the seat cushion 2 instantaneously so as to warm the user seated on the seat cushion 2. The conducting coupler 22 has a first side hidden in the seat cushion 2 and formed with a positioning plate 221 attached to the seat cushion 2 by sewing and a second side protruding from the seat cushion 2 and formed with an outer thread 220.

Referring to FIGS. 1-4, the control switch 3 has a first side provided with a first electric cord 310 having a distal end provided with a plug 31 that is inserted into a cigarette lighter (not shown) of the car to supply an electric power to the control switch 3 and a second side provided with at least one second electric cord 320 having a distal end provided with a connector 32 that is detachably connected with the conducting coupler 22. In the preferred embodiment of the present invention, the control switch 3 is provided with two second electric cords 320 and two connectors 32. The connector 32 of the control switch 3 is provided with a mounting ring 321 mounted on the conducting coupler 22 and having an inner wall formed with an inner thread 322 screwed onto the outer thread 220 of the conducting coupler 22 to attach the connector 32 to the conducting coupler 22. The control switch 3 has a top provided with a power supply button 30, a plurality of indication lamps 36, and a switching button 34 and has an inside provided with an automatic timing device. The automatic timing device of the control switch 3 has a preset value (about 10 to 15 minutes), so that when the time for supplying the electric power reaches the preset value of the automatic timing device, the automatic timing device shuts the electric power of the control switch 3 automatically to stop operation of the heating apparatus to prevent the electric power supplied by the car battery from being exhausted when the user forgets to turn off the power supply button 30 of the control switch 3. If the user wishes to start operation of the heating apparatus again, he only needs to press the power supply button 30 of the control switch 3 again so as to heat the seat cushion 2 successively.

In operation, referring to FIGS. 1-5, when the heating apparatus is mounted on the seat of the car, the conducting coupler 22 is located at a front end or a side of the seat 11 of the car and partially protrudes from the seat cushion 2. In assembly, the connector 32 of the control switch 3 is attached to the conducting coupler 22, and the plug 31 of the control switch 3 is inserted into the cigarette lighter of the car to supply the electric power to the control switch 3, so that the electric current from the car battery in turn flows through the control switch 3, the conducting coupler 22 and the conducting cord 211 into the carbon fiber bundles 210 which produce an impedance to convert the electrical energy into a heat energy to heat the seat cushion 2 instantaneously so as to warm the user seated on the seat cushion 2, thereby providing a comfortable sensation to the user. When the power supply button 30 of the control switch 3 is pressed during a period of time, e.g., at least two seconds, after the electric power is connected by insertion of the plug 31, the heating apparatus is started, so that the electric current is allowed to flow into the carbon fiber bundles of 210 the carbon fiber heating layer 21 to heat the seat cushion 2. Then, the power supply button 30 of the control switch 3 is pressed slightly to regulate the heating temperature values of the seat cushion 2, and the heating temperature values of the seat cushion 2, including high, middle and high values, are indicated by the indication lamps 36 of the control switch 3. At this time, the automatic timing device of the control switch 3 is also started, so that when the time for supplying the electric power reaches the preset value of the automatic timing device, the automatic timing device shuts the electric power of the control switch 3 automatically to stop operation of the heating apparatus to prevent the electric power supplied by the car battery from being exhausted when the user forgets to turn off the power supply button 30 of the control switch 3. Alternatively, when the user wishes to stop operation of the automatic timing device, the power supply button 30 of the control switch 3 is pressed during a period of time, e.g., at least two seconds, so as to stop operation of the automatic timing device. In addition, the switching button 34 of the control switch 3 is used to control an electrical connection between any one of the connectors 32 of the control switch 3 with the conducting coupler 22 to save the electric energy and to facilitate the user operating the control switch 3.

Accordingly, when the connector 32 of the control switch 3 is attached to the conducting coupler 22, and the plug 31 of the control switch 3 is inserted into the cigarette lighter of the car, the electric current from the car battery in turn flows through the control switch 3, the conducting coupler 22 and the conducting cord 211 into the carbon fiber bundles 210 which produce an impedance to convert the electrical energy into a heat energy to heat the seat cushion 2 to warm the user seated on the seat cushion 2, thereby providing a comfortable sensation to the user. In addition, the automatic timing device of the control switch 3 is started, so that when the time for supplying the electric power reaches the preset value of the automatic timing device, the automatic timing device shuts the electric power of the control switch 3 automatically to stop operation of the heating apparatus to prevent the electric power supplied by the car battery from being exhausted when the user forgets to turn off the power supply button 30 of the control switch 3. Further, the power supply button 30 of the control switch 3 is pressed slightly to regulate the heating temperature of the seat cushion 2, thereby facilitating the user regulating the heating temperature of the seat cushion 2 according to his requirement. Further, the seat cushion 2 can be removed for washing.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A heating apparatus, comprising:
   a carbon fiber heating layer placed in a positioning jacket which is mounted in a seat cushion;
   a conducting coupler mounted on the seat cushion and electrically connected to the carbon fiber heating layer;
   a control switch electrically connected to the conducting coupler to supply an electric power through the conducting coupler to the carbon fiber heating layer;
   wherein the carbon fiber heating layer includes a conducting cord, and a plurality of carbon fiber bundles each having two ends connected to the conducting cord.

2. The heating apparatus in accordance with claim 1, wherein the control switch has a top provided with a switching button.

3. The heating apparatus in accordance with claim 1, wherein each of the carbon fiber bundles has a flat shape.

4. The heating apparatus in accordance with claim 1, wherein each end of each of the carbon fiber bundles is bonded to the conducting cord.

5. The heating apparatus in accordance with claim 4, wherein each end of each of the carbon fiber bundles is bonded to the conducting cord by a hub.

6. The heating apparatus in accordance with claim 1, wherein the conducting coupler is electrically connected to the conducting cord of the carbon fiber heating layer.

7. The heating apparatus in accordance with claim 1, wherein the positioning jacket is mounted in the seat cushion by sewing.

8. The heating apparatus in accordance with claim 1, wherein the carbon fiber heating layer further includes a plurality of plastic thin film layers each enclosed around a surface of a respective carbon fiber bundle to provide a waterproof effect to the carbon fiber bundles.

9. The heating apparatus in accordance with claim 1, wherein the control switch has a top provided with a power supply button.

10. The heating apparatus in accordance with claim 1, wherein the control switch has a top provided with a plurality of indication lamps.

11. A heating apparatus, comprising:
a carbon fiber heating layer placed in a positioning jacket which is mounted in a seat cushion;
a conducting coupler mounted on the seat cushion and electrically connected to the carbon fiber heating layer;
a control switch electrically connected to the conducting coupler to supply an electric power through the conducting coupler to the carbon fiber heating layer;
wherein the conducting coupler has a first side hidden in the seat cushion and formed with a positioning plate attached to the seat cushion by sewing.

12. The heating apparatus in accordance with claim 11, wherein the conducting coupler has a second side protruding from the seat cushion and formed with an outer thread.

13. The heating apparatus in accordance with claim 12, wherein the connector of the control switch is provided with a mounting ring mounted on the conducting coupler and having an inner wall formed with an inner thread screwed onto the outer thread of the conducting coupler to attach the connector to the conducting coupler.

14. A heating apparatus, comprising:
a carbon fiber heating layer placed in a positioning jacket which is mounted in a seat cushion;
a conducting coupler mounted on the seat cushion and electrically connected to the carbon fiber heating layer;
a control switch electrically connected to the conducting coupler to supply an electric power through the conducting coupler to the carbon fiber heating layer;
wherein the control switch has a first side provided with a first electric cord having a distal end provided with a plug that is inserted into a cigarette lighter to supply an electric power to the control switch and a second side provided with at least one second electric cord having a distal end provided with a connector that is detachably connected with the conducting coupler.

15. The heating apparatus in accordance with claim 14, wherein the control switch is provided with two second electric cords and two connectors.

* * * * *